United States Patent [19]

Stites

[11] Patent Number: 4,514,050
[45] Date of Patent: Apr. 30, 1985

[54] DOVE PRISM FOR CONVERGENT LIGHT PATHS

[75] Inventor: David G. Stites, Elgin, Ill.

[73] Assignee: Bell & Howell Company, Chicago, Ill.

[21] Appl. No.: 400,810

[22] Filed: Jul. 22, 1982

[51] Int. Cl.³ .......................... G02B 5/04; G02B 17/00
[52] U.S. Cl. .................................. 350/444; 350/168; 350/286
[58] Field of Search ................... 350/444–446, 350/286, 168, 287

[56] References Cited

U.S. PATENT DOCUMENTS

| | | | |
|---|---|---|---|
| 1,525,657 | 2/1925 | Roach | 350/444 X |
| 1,668,015 | 5/1928 | Harris | 350/445 X |
| 2,983,183 | 5/1961 | Pickering | 350/286 |
| 3,001,448 | 9/1961 | Day | 350/444 |

Primary Examiner—John K. Corbin
Assistant Examiner—Scott J. Sugarman
Attorney, Agent, or Firm—Neal C. Johnson; Alan H. Haggard; Alan B. Samlan

[57] ABSTRACT

An apparatus for correcting aberrations in prisms in convergent light paths. The prism has a transparent entrance and exit face which are connected by a hypotenuse surface. The effect of adding a wedge-shaped addition is made on one of the entrance or exit faces to create a compensating dispersive spectrum to compensate for lateral chromatic aberration. The hypotenuse surface is formed as a spherically convex surface to produce a compensating astigmatic aberration to compensate for the astigmatic aberration caused by the entrance and exit faces of the prism.

7 Claims, 3 Drawing Figures

DOVE PRISM FOR CONVERGENT LIGHT PATHS

This invention relates to dove prisms and more particularly to a dove prism which is aberration corrected for convergent light to minimize astigmatism and lateral chromatic aberrations.

In this description of the invention, the dove prism is related to a very common application, that of image "de-rotation" which is more correctly identified as "orienting" the image for normal upright reading in a microfilm reader which projects roll or strip microfilm images on a viewing screen and/or to a suitable image copying medium whereby a full size version of the original document can be recovered. When the microfilm is placed in such a reader for projecting the image on its viewing screen, it is preferable that the user be able to view the image in its readable, right side up orientation. Due to the various orientations of the original documents when they are photographed in roll microfilm cameras, it is usually necessary to rotate the image to orient it properly for the user when the images are projected. Generally, such image rotation is achieved by the use of a dove prism. The size of the prism is dependent upon the optical path in the projection apparatus.

The dove prism has the characteristic of inverting an image from top to bottom with respect to its base which is horizontal, but not left to right. Furthermore, the image is rotated twice as fast and in the same direction as the rotation of the prism. For example, if the prism is rotated forty five degrees, the image is rotated through ninety degrees; and if the prism is rotated ninety degrees, the image is rotated one hundred eighty degrees.

Thus, when the dove prism is used to rotate images for viewing in their proper orientation, an additional mirror must be employed to preserve the "handedness" of the projected image so that the image is not reversed left to right. Alternatively, the microfilm or object could be inserted in such a manner as to eliminate the reversal of handedness. Thus, written or text oriented documents can be rotated for proper reading without being reversed left to right.

The dove prism does have shortcomings, as will be discussed below, when used in convergent light paths such as found in microfilm readers, and in other optical apparatus requiring this type of prism for image de-rotation, e.g. fire-control periscopes, telescopes, viewers, etc.

The dove prism is generally manufactured so that it appears as a truncated isosceles triangle when viewed from a side view perpendicular to both the entrances and exit faces. In a parallel light application the imaging rays corresponding to each point on the object arrive as parallel rays to the hypotenuse face of the prism. After being refracted downward at the entrance face, the rays are reflected upward from the hypotenuse and exit after a second refraction at the exit face where they remain parallel. The image is inverted without the addition of any substantial amount of degrading aberrations except those due to fabrication errors in the three faces and refractive variations in the glass.

The dove prisms in long conjugate, convergent light act as a thick tilted plate of glass which is tilted with respect to the axis of the imaging rays. The main problem with using a dove prism in a convergent light beam or path is that it will introduce a substantial amount of astigmatism and lateral chromatic aberration. These image degrading aberrations can impair the image quality as measured by resolution in microfilm readers and reader printer applications or other optical instruments requiring such an image rotation device.

Another problem in using dove prisms for image rotation, is that in order to minimize or eliminate light bundle vignetting, larger dove prisms must be utilized especially as the angle of view of the system is made large. However, the chromatic and astigmatic aberrations which are increased proportionally when the size of the prism is increased eventually necessitate some form of aberration reduction.

Applicant's solution to the problem is to alter the dove prism face angle between either the entrance face and the hypotenuse face, or the exit face and the hypotenuse face to establish a thin inclined glass wedge which produces a compensating chromatic aberration spectrum. This compensating spectrum is of the proper magnitude and sign to largely compensate for the lateral chromatic aberration of the prism. By taking into account the glass refractive index, thickness, and chromatic dispersion, the correcting angle can be determined.

Applicant has been able to reduce astigmatism by making the hypotenuse face slightly convex instead of the normal flat planar surface which is customary. Thus, an astigmatic aberration of a compensating nature is also produced by an oblique beam incident on the internal reflecting face or hypotenuse, thereby offsetting the astigmatic aberration of the prism.

As the compensating aberrations are established by altering the prism itself, the correcting factors are built into the prism and rotate with and as part of the prism. Thus, additional parts which must be added to the optical system and made to rotate with the system are not required.

By building the corrective aberrations into the prism itself, Applicant is able to manufacture the prisms on mass production automated equipment. This greatly reduces or eliminates hand lapped or hand ground prisms which are very expensive to make and lack uniformity and constant quality from prism to prism. The magnitude of the corrections required are on the order of the manufacturing tolerances typically needed to make "good quality" prisms. Thus, this corrective design is partially one of balancing and controlling the magnitude and sign of the manufacturing tolerances regarding prism angles and surface shape.

OBJECTS AND ADVANTAGES

Thus, it is an object of the invention to provide a dove prism for use in convergent light which produces a compensating spectrum to compensate for the lateral chromatic aberration of the prism. A related object is to provide a compensated prism which is operable for all magnifications in a given fixed track length, with some track length variation being permitted.

Another object is to provide a dove prism which has the hypotenuse face spherically convex so that an astigmatic aberration of a compensating nature is produced to overcome the astigmatism of the prism resulting from its being used in a convergent lightpath.

A related object is to provide a dove prism which has these compensating aberrations built into the prism so that they rotate with and are a part of the prism. Associated therewith is to provide such a prism without the need of supplying additional parts or components to the optical system.

Yet another object is to be able to use larger dove prisms to eliminate light bundle vignetting and especially even larger prisms of lower refractive index while compensating for the otherwise undesirable increase in lateral chromatic and astigmatic aberrations.

Yet another object is to provide a prism which produces negligible image tilt and deviation errors while substantially compensating for lateral chromatic and astigmatic aberrations.

Still another object is to provide in microfilm reader applications a prism which allows for the image plane and object plane to be somewhat non-parallel while still producing an acceptable image while correcting for aberrations.

Another goal is to be able to manufacture and provide such prisms at economical costs by designing the prisms so that they can be mass machined and not hand ground, polished, lapped, or "figured" one at a time. Such one at a time hand "figuring" is required when aspheric correction to a reflecting or refracting face is necessary.

These and other objects and advantages will become apparent upon reading the description of the drawings and detailed description of the preferred embodiment.

DETAILED DESCRIPTION OF THE PREFERRED EMBODIMENT

Figure 1:
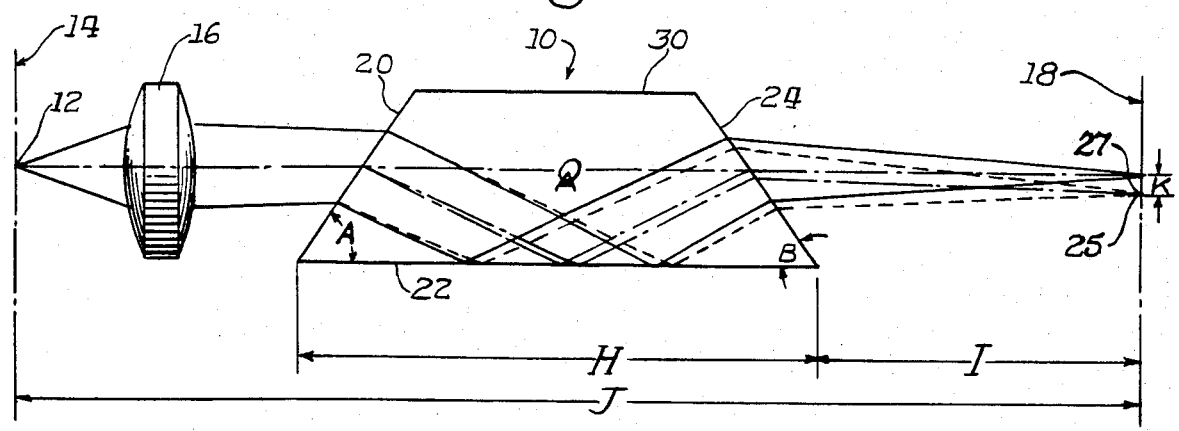
FIG. 1 is a schematic illustration of a dove prism of the prior art in an optical system.

Turning first to FIG. 1 there is illustrated a schematic representation of a convergent light path optical system utilizing a conventional dove prism. Such optical systems are normally found in apparatus such as microfilm readers and reader printers wherein image rotation is a desirable or necessary feature. The dove prism 10 inverts the projected image top to bottom but not left to right in a manner which is commonly known in the art. By rotating the prism, the image is rotated twice as fast. For example, if the prism is rotated ninety degrees, the image is rotated one hundred eighty degrees.

If the dove prism 10 is used in a convergent light beam, as in microfilm apparatus, it will introduce a substantial amount of astigmatism and lateral chromatic aberration. These image degrading aberrations severely limit the resolution in microfilm reader and reader printer applications and other optical instruments requiring an image rotation device especially when they combine unfavorably with similar aberrations caused by the projection lens itself. Larger dove prisms are desirable and at times necessary in order to reduce or eliminate light bundle vignetting. However, as the prism is enlarged, the lateral chromatic and astigmatic aberrations are increased to such a degree that image degradation results in an unacceptable image.

In FIG. 1, a typical application would include film 12 lying in a film plane 14. Generally there would be various images on the film 12. A source of illumination (not illustrated) would pass through the image on the film 12 through a projection lens 16 which would cause the illumination or imaging rays to converge at a distant image plane or viewing screen 18. The imaging rays enter the dove prism 10 at an entrance face 20. They are then refracted downward from the entrance face 20 towards a hypotenuse surface 22. The rays are then reflected upward from the hypotenuse surface 22 and emerge after a second refraction at an exit face 24. The inverted image is then focused on the image plane 18.

In general, the index of refraction of optical materials is higher for short blue wavelengths than for long red wavelengths. This causes the short wavelengths (illustrated by the solid lines in FIG. 1) to be more strongly refracted at each surface 20, 24, of the prism 10 so that the blue light rays form a blue image at 27 while the red light rays (illustrated by the dashed lines) are not refracted as much and form an image at 25. This results in lateral color, or chromatic aberration resulting in a displaced set of images for different wavelengths and is illustrated in FIG. 1 as the distance K.

Generally, the dove prism 10 has its base angles A and B equal and often each at forty-five degrees. Other angles can be used depending upon the desired characteristics of the prism. However, the dove prism 10 is almost always manufactured such that the entrance face 20 and exit face 24 are mirror images of each other with the base angles A and B equal. As the top portion of the prism is not used, it is truncated leaving a top plane 30.

Figure 2:
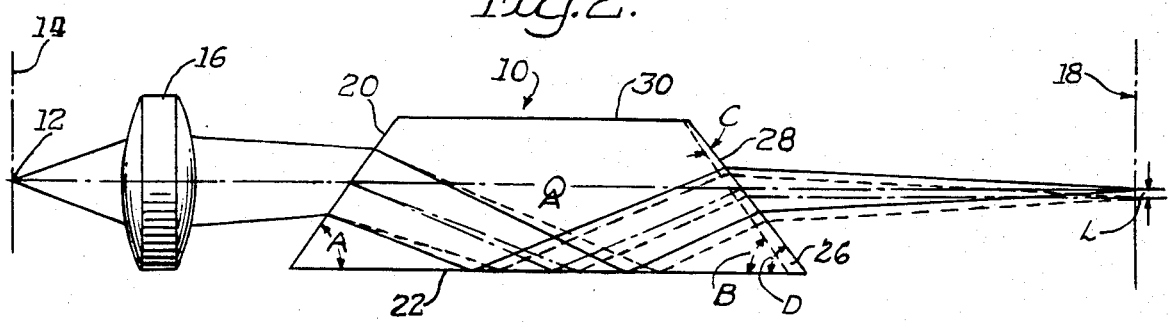
FIG. 2 is an schematic illustration of Applicant's inventive dove prism which compensates for lateral chromatic aberrations.

Turning to FIG. 2, there is illustrated Applicant's inventive concept to compensate for the lateral chromatic aberration of the prism. A wedge-shaped element of glass 26 is added to the exit face 24. This creates a new exit face 28 from the prism 10. The angle of the new exit face 28 with respect to the previous exit face 24 is indicated by angle C. The angle of the face 28 with the hypotenuse surface 22 is illustrated as angle D. It can be seen that angle D will be less than angle B by an amount exactly equal to the amount that the wedge 26 adds to the old face 24. The additional wedge 26 creates a compensating dispersive spectrum of proper magnitude and sign to largely compensate for the lateral chromatic aberration of the prism. The correcting angle C depends on the glass refractive index and chromatic dispersion. For example, given the following parameters, we can compute the correcting angle C. The length of the flat hypotenuse surface 22, H, was approximately 1.8 inches. The length from the intersection of the hypotenuse surface 22 with the exit face 24, I, was 32 inches. The distance from the film plane 14 to the image plane 18, J, was approximately 36 inches. The index of refraction of the prism $n_d$, is equal to 1.74 and the partial reciprocal dispersion $V_d$ is equal to 30. Angles A and B are 45 degrees. Using these characteristics, the correcting angle C was found to be approximately 17 minutes. The lateral color, or chromatic difference of magnification was reduced to less than 5% of K and is illustrated as L in FIG. 2.

In the actual manufacturing and production of the prism, the wedge-shaped element 26 was not actually added to an existing prism. Rather, the prism is made so that the exit face 24 is not ground, but instead the exit face 28 is the face manufactured and formed as the exit face of the prism at the required compensating angle.

Figure 3:
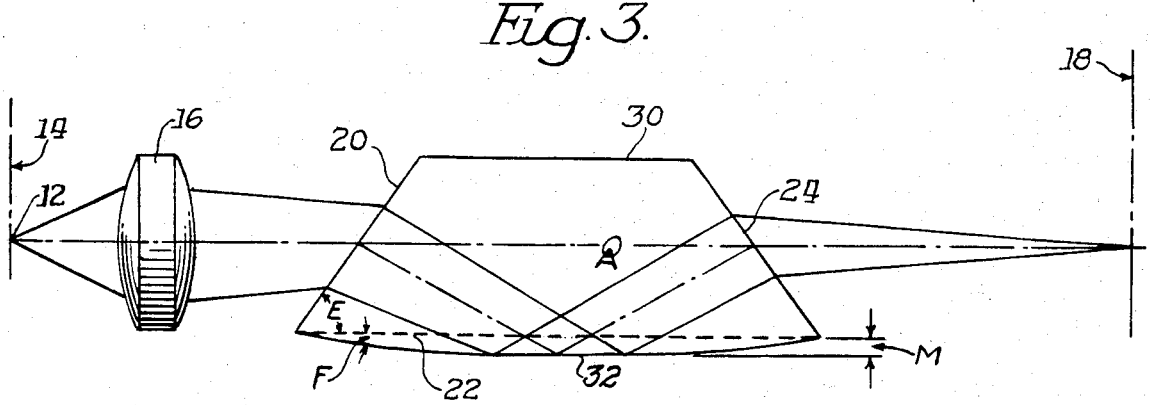
FIG. 3 is a schematic illustration of Applicant's inventive dove prism which compensates for astigmatic aberration.

FIG. 3 illustrates Applicant's inventive solution to correct for the astigmatic aberration. By making the hypotenuse surface 22 convex, an astigmatic aberration of a compensating nature is produced by the obliquely incident imaging rays which offsets the aberration of the prism. A new convex hypotenuse surface 32 creates this compensating aberration. In FIG. 3 the amount of the sag or bow of the convex curvature is greatly exaggerated and is illustrated as M. The angle between the previous surface 22 and the convex surface 32 is illustrated as angle F. F is virtually zero because there is not an angle of error at the vertex at either side of the prism. In an ideal prism, surface 22 has an infinite spherical radius, or zero curvature.

The sag or bow M in optical tolerance terms is calculated by the formula $K\lambda/2$, whereas $\lambda$ is equal to the wavelength and K is the number or fraction of wavelengths or "fringes" of sag from a plane and typically is equal to ½ fringe. Therefore, the sag M is approximately equal to $\lambda/4$, or in the order of 5 micro inches. This correction is very sensitive due to internal reflection in a high refractive index medium.

The convex sag M is dependent upon the ray bundle diameter, the internal angle of incidence on the hypotenuse face, the refractive index of the glass of the prism, and the optical thickness or path length of the prism. Generally, the amount of convex sag M is in the order of 4 to $12 \times 10^{-6}$ inches per 2 inches of optical path length in the prism. Furthermore, it is sufficient that the convex curvature be spherical as opposed to other optic forms such as toric, cylindrical, or other aspheric forms which are sometimes used as corrective shapes despite their being difficult to manufacture.

In the production of prisms of this nature, great economic benefits are achieved if a whole block of prisms are formed at once. This can be accomplished by placing a group or series of prisms to be ground in an optical grinding machine. The controls are set for grinding a spherical surface on hypotenuse faces, and all of the prisms are ground at once. This improves quality control as the prisms are not individually hand lapped or ground. It is preferable to manufacture the prisms, such that they incorporate both the wedge 26 and the convex hypotenuse surface 32 in one prism such that the prism compensates for both the lateral chromatic aberration and astigmatic aberration together.

Such techniques as described above may also be applied to a Schmidt prism, for example, which can also be used as an image rotator in a manner similar to a dove prism. This method of compensating for the lateral chromatic aberration is also suited to any tilted optical window relative to the optic axis and to other prism forms with entrance and/or exit faces not normal to the optic axis. The principal difference being that a prism employs at least one internally reflecting face to which the light rays are obliquely incident thereby affording the added opportunity to compensate for astigmatism caused by oblique refraction at entrance and exit faces.

The technique is one generally to be recognized as an improvement to such optical components needing a significant improvement or extension of suitability to the optical purposes they are put to. For example, if the simple dove prism can be applied to solve a problem using only these error correction techniques, this becomes a valuable method. To invoke the improvements taught herein when not necessary, would be considered wasteful in effort and expense.

Thus there has been provided a dove prism that fully satisfies the objects, aims and advantages set forth above. It is evident that many alternatives, modifications, and variations will be apparent to those skilled in the art. Accordingly, it is intended to embrace all such variations as fall within the spirit and broad scope of the appended claims.

What is claimed is:

1. Apparatus for correcting chromatic and astigmatic aberrations in prisms in convergent light paths comprising:
    a transparent entrance face permitting converging imaging rays to enter the prism;
    a transparent exit face permitting the converging imagining rays to exit the prism;
    a third face connecting the entrance and exit faces and reflecting substantially all of the imaging rays received from the entrance face internally into the prism and towards the exit face;
    the third face disposed at an acute angle with respect to both the entrance and exit faces, with the angle between the third face and the entrance face different than the angle between the third face and the exit face, the angles selected to create a compensating chromatic aberration to compensate for chromatic abberrations caused by the prism when used in convergent light paths and the compensating chromatic aberration is a chromatic spectrum of the proper magnitude and sign to substantially compensate for lateral chromatic aberrations of the prism,
    the third face further having a spherical, convex curvature which produces a compensating astigmatic aberration to compensate for the astigmatic aberration caused by the entrance and exit faces acting on the converging imaging rays.

2. The apparatus of claim 1 wherein the angle between the third face and the entrance face is greater than the angle between the third face and the exit face.

3. The apparatus of claim 2 wherein the difference in acute angles formed by the third face and the entrance face and the third face and the exit face is less than one degree.

4. The apparatus of claim 1 wherein the amount of convex curvature of the third face is in the range of two to six parts per million of optical path length of prism.

5. The apparatus of claim 1 wherein the third face is a hypotenuse surface of the prism.

6. A dove prism for use in micro image projection devices which corrects for lateral chromatic and astigmatic aberrations in convergent light paths comprising:
    a transparent entrance face permitting converging imaging rays to enter the prism;
    a transparent exit face permitting the converging imaging rays to exit the prism;
    a spherical, convex curvature third face connecting the entrance and exit faces and reflecting the rays received from the entrance face internally into the prism and towards the exit face;
    the curvature of the convex third face selected to produce a compensating astigmatic aberration to compensate for the astigmatic aberration caused by the entrance and exit faces acting on the converging imaging rays;
    the third face angularly disposed with respect to the entrance and exit faces, the angle between the entrance face and the third face different than the angle between the exit face and the third face, the angles selected to create a compensating chromatic spectrum of the proper magnitude and sign to substantially reduce the lateral chromatic aberration caused by the prism when used in convergent light paths.

7. The dove prism of claim 6 wherein the third face is a hypotenuse face of the prism.

* * * * *